United States Patent [19]

Grundy et al.

[11] 3,882,281

[45] May 6, 1975

[54] CONTROL AND SUPERVISION OF TELECOMMUNICATIONS SWITCHING NETWORKS

[75] Inventors: Brian Grundy, Ashton-in-Makerfield; Robert Toy, Fairfield, both of England

[73] Assignee: Plessey Handel und Investments A.G., Zug, Switzerland

[22] Filed: May 31, 1973

[21] Appl. No.: 365,645

[30] Foreign Application Priority Data

June 6, 1972 United Kingdom.............. 26302/72

[52] U.S. Cl. ............................................ 179/18 E

[51] Int. Cl. ............................................ H04m 3/42

[58] Field of Search ................................. 179/18 E

*Primary Examiner*—William C. Cooper

*Attorney, Agent, or Firm*—Scrivener Parker Scrivener & Clarke

[57] ABSTRACT

A marker is provided for use in conjunction with a central data processing equipment in the control of a telecommunications switching network, which marker provides additional and improved facilities in respect of control, monitoring and status reporting.

11 Claims, 5 Drawing Figures

CONTROL AND SUPERVISION OF TELECOMMUNICATIONS SWITCHING NETWORKS

Figure 1:
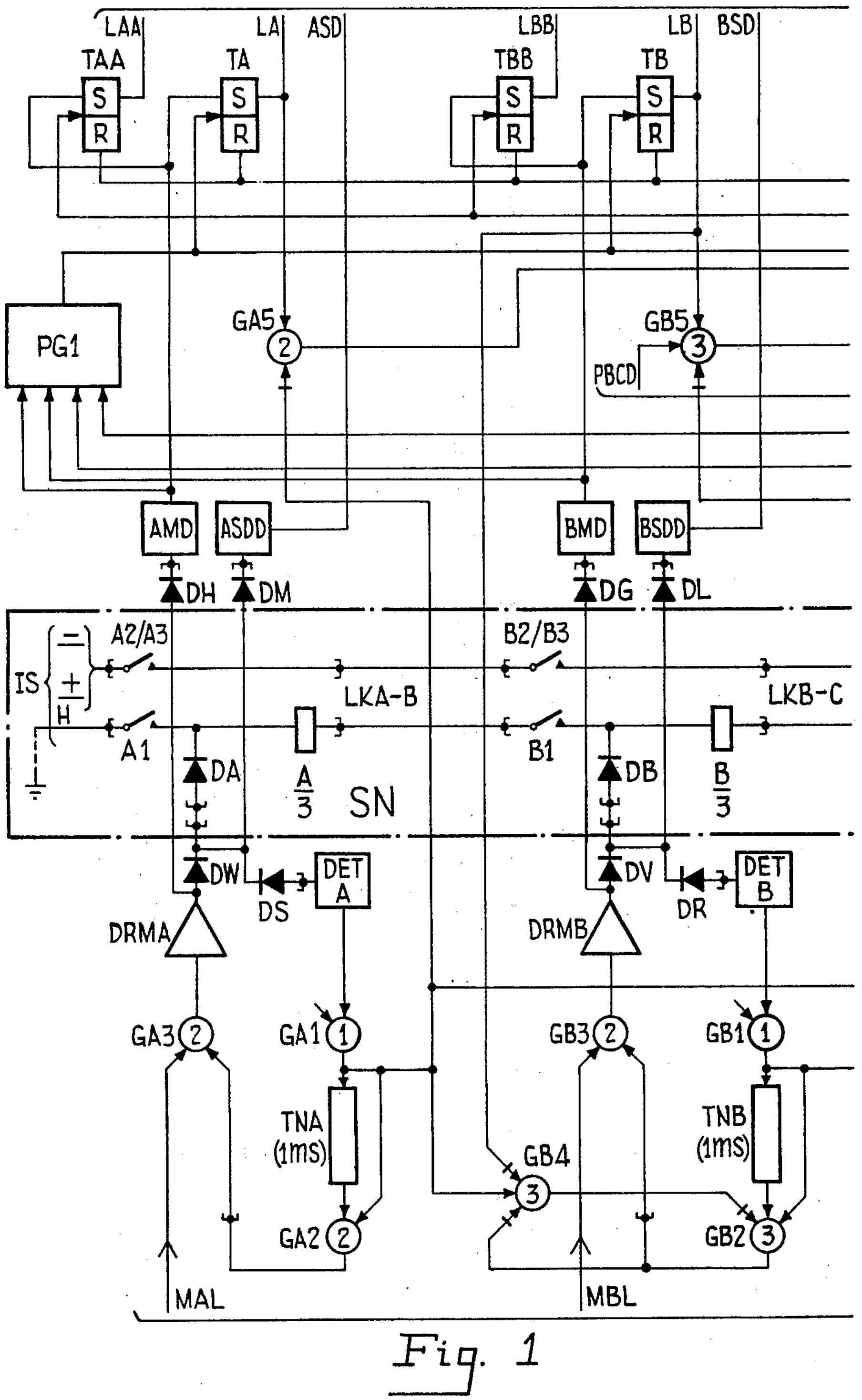
Figure 2:
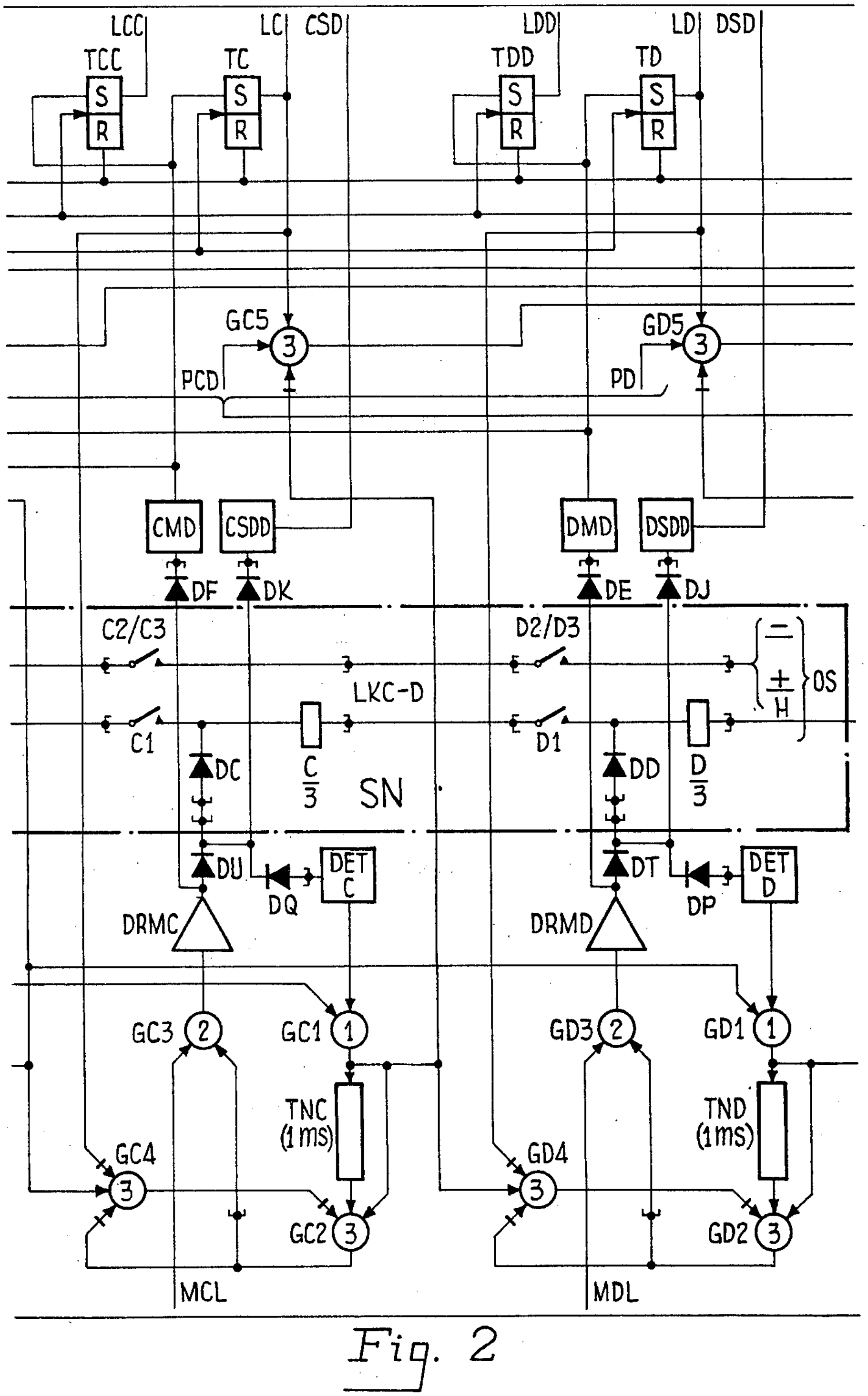

The present invention relates to the control and supervision of telecommunications switching networks of the kind formed by a succession of link-connected ranks or stages of matrix switches wherein each of the switches comprises electromagnetic crosspoint relays, and the establishment of connections over the network is controlled by marking means.

A matrix switch, formed by columns and rows of crosspoint relays and having a plurality of inlets and a plurality of outlets, enables any inlet to be connected to any outlet by the operation of the appropriate crosspoint relay. The crosspoint relays may be of the so-called reed-type having a plurality of individual encapsulated contact units adapted for actuation by a magnetic field which is impressed upon them when an associated electrical winding is energised.

In a known matrix switch involving single-winding crosspoint relays each with a plurality of "make" contact units, the switch is controlled by first marking conductors individual to each (say) column of the matrix and by second marking conductors individual to each (say) row of the matrix; each first marking conductor extending to one side of the winding of each relay of the pertinent column over rectifier diodes individual to the relays; and each second marking conductor, which is also to serve as a holding conductor appropriate to a particular row, extending to the complementary side of the winding of each relay of the pertinent row. In this known arrangement, which has a before-mentioned rectifier diode (conveniently known as a marking diode) individual to each crosspoint relay, for isolating purposes, each crosspoint relay is provided with a "make" contact unit which is additional to those concerned with the direct switching-through of an inlet-to-outlet connection over the matrix switch. This contact unit has one side connected to the junction of its own relay coil and the associated diode, and its other side connected in common with identical contact units of relays of the same column to a holding conductor appropriate to the particular column.

With this arrangement, and arbitrarily assuming that the switch inlets and outlets are related to individual columns and rows respectively, the co-ordinate marking of one column marking conductor and one row marking/holding conductor results in the exclusive operation of the particularly defined crosspoint relay in series with its marking diode. Accordingly a through-connection is set-up between the relevant inlet and outlet. Furthermore the additional contact unit of the relay completes a holding path for the relay, between the pertinent column holding conductor and the pertinent row marking/holding conductor since it is arranged that suitable potentials are evident at these conductors when the marking potentials are removed. A switch of this kind enables a plurality of separate connections through it to be in the established state concurrently, e.g. a switch with eight inlets and eight outlets caters for eight concurrent connections, although each requires to be set-up individually.

A matrix switch of the kind outlined will be conveniently referred to hereinafter as a matrix switch employing marking diodes between its inlet marking leads and the crosspoint relay coils.

In the case of a switching network comprising a plurality of link-connected ranks or stages of matrix switches of the kind referred to, the so-called marker which is employed for setting-up of connections through the network on a one-at-a-time basis is arranged, in accordance with received instructional signals to present markings to salient points of the network whereby the whole of the connection which is required to be set-up is uniquely defined. The particular form of network contemplated has all the matrix switches of all its ranks or stages identically oriented from the electrical point of view, so that following the earlier assumption that the matrix columns and rows appertain to switch inlets and outlets respectively, and that arbitrarily the inlets of the first stage switches are the inlets of the network whereas the outlets of the last stage switches are the outlets of the network, then the before-mentioned hold contact unit of every crosspoint extends to or towards the inlets side of the network.

With a network arrangement of this kind, the number of markings involved in the setting-up of a connection is one more than the number of ranks or stages involved in the network. Thus in the case of a four-stage network (stages A, B, C and D) a connection which is required to be set-up through all stages is defined by a unique combination of five markings:

1. to define the particular network outlet being the outlet (row) of one D-stage switch,
2. to define the required inlet (column) of the aforesaid D switch; the particular inlet being pertinent to a C–D link and therefore being uniquely related to an outlet of a certain C-stage switch,
3. to define the required inlet of the just mentioned C-stage switch and, in consequence of the related B–C link, a particular outlet of a certain B-stage switch,
4. to define the required inlet of the just mentioned B-stage switch and, because of the related A–B link, a particular outlet of that A-stage switch serving a group of network inlets including that one concerned in the required connection,
5. to define the particular network inlet, being an inlet (column) of the just mentioned A-stage switch.

When the five markings appropriate to the required connection through the network are applied, markings 1 and 2 effect operation of the uniquely defined D-stage matrix relay, so that one step of the through connection is completed. The before-mentioned additional contact unit of the D crosspoint relay advances a marking condition over the hold wire of the C–D link to the marking conductor of the relevant outlet of that C-switch which is already in receipt of marking 3 above defining its required inlet.

The co-ordinate marking of the particular C-switch in this manner results in the operation of the uniquely defined crosspoint relay of that switch, so that a second step in the establishment of the through connection is completed, whereas the additional contact unit of the operated C-switch crosspoint relay passes a marking condition over the hold-wire of the nominated B–C link to the marking conductor of the relevant outlet of that B-switch which is already in receipt of marking 4 above, defining its required inlet. The resulting operation of the pertinent B-switch crosspoint completes the third step of the through connection and passes a marking condition to the appropriate A-stage matrix switch.

The last-mentioned marking condition operative coordinately with marking 5 above, brings about operation of the required crosspoint relay of the defined A-stage switch to complete the four-stage through connection. The additional contact of the particular A-stage crosspoint relay also completes a path to a device associated with the particular network inlet to permit each of the four relays appertaining to the through-connection to be maintained in series, over a hold path, involving the additional contact of each of those relays. Holding potentials are duly evident at the particular inlet and outlet of the switching network so that the connection is independently maintained, when the marker is duly released in readiness for use in the establishment of a subsequent connection.

A switching network of the general kind outlined above, which comprises a succession of marking-controlled stages of identically-oriented matrix switches with a marking diode for each crosspoint relay and which provides for sequential operation of crosspoint relays appertaining to a connection, together with series holding of those relays, may now be referred to as a switching network of the kind hereinbefore defined.

Arising from the advent of high-speed digital computers considerable development has taken place in the use of data processors for the overall management of telecommunications switching centres or exchanges.

Switching networks of the kind referred to, being capable of setting up connections at relatively high-speed, are imminently suitable for use in conjunction with data processors to constitute automatic telephone exchanges and the like.

It is already known in the case of stored-programme data processors, in this environment, to incorporate therein a so-called "map" incorporating an array of storage elements, e.g. magnetic cores, which, in a sense, may be considered as being a replica of the or each switching network served by the data processor or the data processor complex. This map constitutes a record of the prevailing busy or idle states of the salient points (network inlets, outlets and links) of the or each switching network, of the exchange.

When, as a result of information forthcoming to the data processor, it is determined that a connection is required to be set up between a particular network inlet and outlet, the map is interrogated in respect of all possible paths between those network terminations. Of these paths, those which are assessed as unavailable, due to "busy" indications provided by pertinent map-storage elements, are discarded. However, in the normal course of events at least one path will be indicated as being available for use. This path, or one of them so indicated, is nominated by the processor; the map-storage elements relevant to the nominated path being duly up-dated to signify busy, and the processor is effective in extending data significant of the nominated path to the network marker by way of suitable interface equipment. The transferred data is stored and the marker is activated, in the case of a switching network of the kind referred to, to effect the setting-up of the required connection progressively from one end; the connection being maintained from potentials at each end when the marker is duly released.

U.S. Pat. No. 3,706,856 discloses a marker for use in conjunction with a switching network of the general type alluded to above, and this provides for certain additional facilities appertaining to the detection and reporting of conditions of fault which may be encountered during attempts to set up connections through the switching network.

An object of the present invention is to provide a marker for use in conjunction with a central data processing equipment in the control of a telecommunications switching network of the general type referred to, and which provides additional and improved facilities in respect of control, monitoring and status reporting.

According to the invention there is provided a switching network, comprising a succession of link-connected stages each having a plurality of matrix switches formed by crosspoint relays, with control equipment, for effecting the setting-up and release of self-holding connections between any inlet and an outlet of the network and characterised in that said equipment has an incoming multi-conductor signalling-path for the reception of individual instruction messages including messages demanding the setting-up and release of specific network connections, an outgoing multi-conductor signalling-path for the transmission of status messages by said equipment, and marking arrangements which are operable either by a setting-up instruction message to selectively mark the outlet and all other salient points of the specified connection with potentials suitable for the establishment of that connection, or by a release instruction message to selectively and exclusively mark the outlet of a specified established connection with a potential such as to effect release of that connection.

Also according to the invention the control equipment also includes a plurality of network-outlet busy/-free interrogation means and storage means for each said interrogation means, and the marking arrangements are so activated that, preparatory to the outlet of the specified connection being marked for setting-up or release purposes, each of a unique set of network outlets including the particular outlet is connected by operation of a predetermined one of a plurality of first relay means of said marking arrangements to a particular one of said interrogation means whereby a signal appropriate to the encountered free or busy state of each of said set of outlets is presented to and stored upon appropriate said storage means for utilisation over said outgoing signalling-path.

Additionally according to the invention, the equipment when employed for setting-up purposes is operative to mark the particular outlet as a result of that outlet being encountered in a free state and not otherwise; the marking potential being connected upon activation of a predetermined one of a plurality of second relay means of said marking arrangements, the number of second relay means provided being equal to the number of outlets in each set.

According to another aspect of the invention, the equipment when employed for the release of a connection is operative to mark the particular outlet as a result of that outlet being encountered busy but not otherwise; the marking potential being connected upon activation of a predetermined one of a plurality of third relay means of said marking arrangements, the number of third relay means provided being equal to the number of outlets in each set.

According to a feature of the invention said control equipment is so arranged that if during an attempt to set up a network any condition of fault is encountered which interferes with establishment of that connection, a forced-release condition is developed by and for said equipment and a status message made available to the outgoing signalling-path includes conditions which are significant of said situation.

The details and various aspects of the invention will be understood from the following description of the preferred method of carrying it into effect which should be read in conjunction with the accompanying circuit drawing comprising FIGS. 1, 2, 3, 4, and 5 arranged side-by-side in that order. The circuit drawing, in abbreviated form for ease of understanding, shows portions of a typical multi-stage switching network of the kind referred to, together with essential parts of the related marker.

GENERAL

The marker is represented in circuit logic form and includes well known forms of electronic gates, timing devices, pulse generators, toggles and drivers together with devices such as resistors, uni-directional diodes and electromagnetic relays; the latter being preferably of the type employing reed-contacts. In the drawing OR gates are represented by a circular symbol enclosing the numerical 1, and these are arranged to produce a "1" signal at the output lead when a "1" signal is applied to any or all of the input leads (signified by arrow heads), but otherwise to produce a "O" output signal. Two forms of AND gate are employed and both are depicted by a circular symbol enclosing a numeral corresponding to the number of input leads; one form of AND gate employing regular input leads exclusively and the second form having a combination of regular input leads and inverted or inhibit input leads. The inverted input leads are signified by a transverse bar adjacent to the arrowhead. An AND gate of first or regular form produces a "1" output signal when a "1" signal is applied to all input leads, but otherwise produces a "0" output; whereas an AND gate of the second form produces a "1" output signal when "1" is evident at each regular input lead concurrently with "0" at each inverted input lead, but otherwise produces an "0" output signal. The timing devices designated TN1 to TN4 and TNA to TND are each arranged to produce a "0" output signal for the period specified when an input signal "1" has been applied; a "1" signal being produced at the end of the period. In each case the delay period is signified in milli-secs. The pulse generators are designated PG1 and PG2 of which the first is arranged to produce a short-duration "1" output pulse on the application of a "1" signal at any of its four input leads, whereas the second is arranged to produce a short-duration pulse due to a transitional input from the "1" condition to the "0" condition. The drivers are denoted by triangular symbols and are each operable by a "1" input signal to produce an output appropriate to the operating requirements of the device which it controls. Eight pairs of electronic toggles are involved in the circuit; the pairs TA/TAA, TB/TBB, TC/TCC and TD/TDD are associated with stages A, B, C and D respectively of the switching network, whereas the other pairs 1TBY/1TF, 2TBY/2TF, 3TBY/3TF and 4TBY/4TF (of which only the first pair is shown) are each concerned with a different group of network outlets (e.g. 96) to embrace the full outlet capacity. In the rectangular representations of the toggles the set and reset sides are indicated by S and R respectively.

The marker is served by a so-called scanner and a distributor enabling information to be interchanged between the marker and the central data-processing equipment by way of an input/output medium. The scanner and distributor are operable on a mutually exclusive basis. At all times the scanner is sequentially scanning the leads of the output path SCAN of the marker but is inoperative until a demand condition is encountered at the "call-scanner" lead CS thereof, whereupon the prevailing states of the other output leads, are communicated by way of the scanner to the data-processing equipment; information appropriate to the identity of the marker concerned and produced elsewhere, being also communicated to the date-processing equipment.

As regards the distributor this is brought into effect under control of the data-processing equipment when the latter requires to communicate control information to the marker, this information is selectively applied to the input leads of the marker which are collectively designated DIST. It may be mentioned that the marker may incorporate a buffer-storage register in the multi-conductor input path for the temporary storage of input data.

Throughout the present specification, electrical potentials are referred to in relationship with earth, e.g. −100v is 100 volts negative with respect to earth.

The switching network SN having inlets and outlets such as IS and OS respectively is represented by one crosspoint relay (A, B, C and D) of one matrix switch of each stage. The crosspoint relays being typically of the reed-contact type, have three "make" contact-units each, and the three inter-stage links appertaining to a network connection involving the four relays are referenced LKA-B, LKB-C, and LKC-D.

Taking the typical crosspoint relay A, its contacts A2 and A3 are concerned with connecting the − and + speech wires of a particular network inlet (inlet or column of the particular A-stage matrix switch) directly to inter-stage link LKA-B. The common symbol, to the left of the collectively represented contacts A2 and A3, signifies that the network inlet is selectively connectable by other A crosspoint relays of the same matrix column to other links such as LKA-B but terminating at inlets (columns) of different B matrix switches. The common symbol to the right of contacts A2 and A3 infers that link LKA-B, terminating on an outlet (row), is selectively connectable to any of those network inlets terminated on the inlets of the particular matrix switch. The common symbols to the left of the contacts A1 and to the right of the winding of relay A have significances corresponding to the symbols immediately above them and already referred to. The common symbol immediately below the marking diode DA (individual to crosspoint relay A) has a corresponding significance to those at the left of contacts A1 to A3 and infers that the common marking lead, extending from marking driver device DRMA, is appropriate to all A crosspoint relays of the particular inlet (matrix column) of the matrix switch concerned; whereas the lower common symbol of said marking lead infers that the marking lead is similarly associated with other matrix switches of the same stage.

It can be deduced that somewhat similar considerations apply in respect of the common symbols associated with the remaining typical crosspoints of the network.

Let us assume initially that a path involving the four typical crosspoint relays has already been established over the network under control of marker which has been released in readiness for setting-up a subsequent connection. Accordingly the contacts of all said relays would be operated (i.e. closed). Under these circumstances the connection is maintained, independently of the now released marker, by earth forthcoming at lead H from say a relay set associated with the particular network inlet IS, and by −50v extending over resistor RH and diode DH to the H lead of the network outlet. The four illustrated crosspoint relays A, B, C and D, having substantially identical coils are held in series over a hold path including contacts A1, B1, C1 and D1. The ohmic values of the components involved in the series holding circuit determine that the specific "busying" potentials obtain at points on the hold wire, namely at links LKA-B, LKB-C and LKC-D and the network outlet (i.e. the junction of relay D and diode DH).

As in U.S. Pat. No. 3,706,856 each stage of the switching network has four voltage-level detectors DETA, DETB, DETC and DETD associated with it, on the basis of one for each switching stage, for monitoring purposes. Each such detector is coupled over groups of isolating diodes such as DP, DQ, DR and DS to the inlet (column) marking diodes such as DD, DC, DB and DA of each switching stage. These detectors are primarily concerned with the detection of attempts to switch into already busy links and may conveniently be referred to as "double-switch" detectors.

Each switching stage also incorporates an additional pair of detectors AMD/ASDD, BMD/BSDD, CMD/CSDD, and DMD/DSDD; the first of each pair being a so-called inlet-marking detector, and the second being a device for detecting the short-circuit condition of a marking diode at the appropriate stage of the switching network.

Each stage of the switching network has a plurality of drivers such as DRMA, DRMB, DRMC and DRMD associated with it. These drivers are to be employed as inlet (column) marking devices, and the number provided for each stage corresponds to the number of inlets (columns) of each matrix switch of the particular stage. The marker is provided with a plurality of marking-control leads, such as MAL, MBL, MCL and MDL included in the multi-conductor input path DIST from the distributor, and again the number of leads in each group corresponds to the number of inlets of each switch of the relevant stage of the switching network. Thus for example, if stage D of the network comprises matrix switches having eight inlets each, eight leads MDL are provided. Each marking-control lead of each group is uniquely associated with an aforesaid marking device which when activated will produce a marking potential (different for each stage) defining a particular inlet of each of the switches of the appropriate stage of the network.

In the exemplary switching network it assumes that 384 outlets such as OS are catered for. Accordingly the marker is provided with 96 electromagnetic relays 1H to 96H, each relay having four "make" contacts. The relays, typified by 1H, are included in a 12 × 8 matrix array controlled by 12 leads such as HP and eight leads such as HQ; said leads being included in the input path DIST emanating from the distributor. Moreover, the marker incorporates four pairs of relays 1RY/1RZ, 2RY/2RZ, 3RY/3RZ and 4RY/4RZ of which only the first pair are fully represented. The first of each of said pairs of relays is concerned with the selective release of established network connections, whereas the second of each pair is concerned with the setting up of connections over the network. Four leads, such as lead YZ are included in the input path of the marker, and each of these relates to a different pair of said relays, so that when one of the leads is duly marked it serves to identify the particular pair of relays.

Two further leads, RL and SU, are included in the input path from the distributor; the first when marked infers that the marker is required to perform at a connection-release function in respect of an established network connection, whereas the second when marked indicates that the setting up of a network connection is to be performed. Accordingly the marking of lead RL is concerned in the operation of relay 1RY, 2RY, 3RY or 4RY of that pair identified by the marking of a particular one of the four leads such as YZ, whereas the marking of lead SU is concerned in the operation of relay 1RZ, 2RZ, 3RZ or 4RZ of any pair likewise identified. The individual lead ST of the marker input path is the start lead of the marker, and lead TEST is to be employed when the marker is required to perform the testing of network outlet-conditions exclusively.

Figure 3:
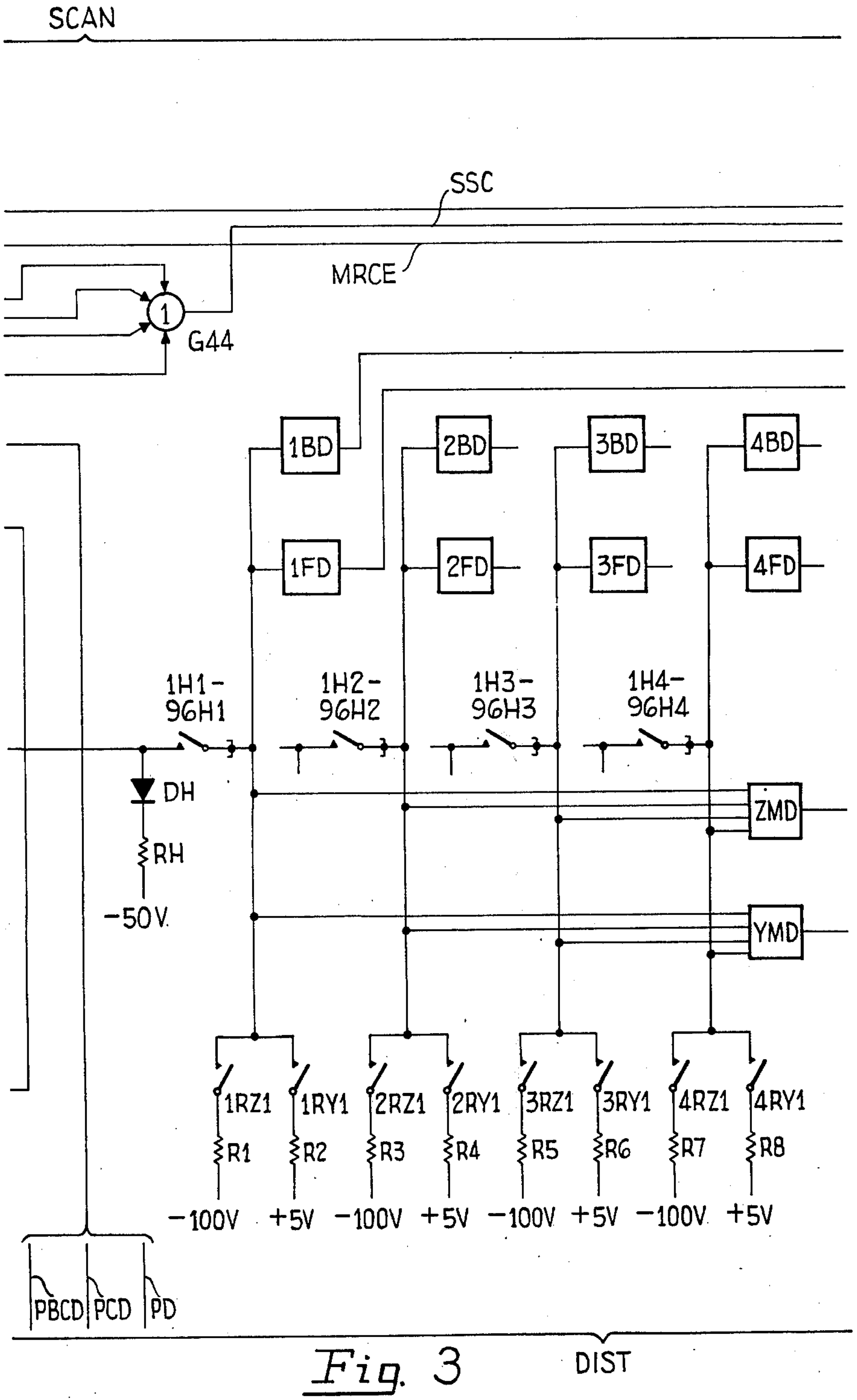
Figure 4:
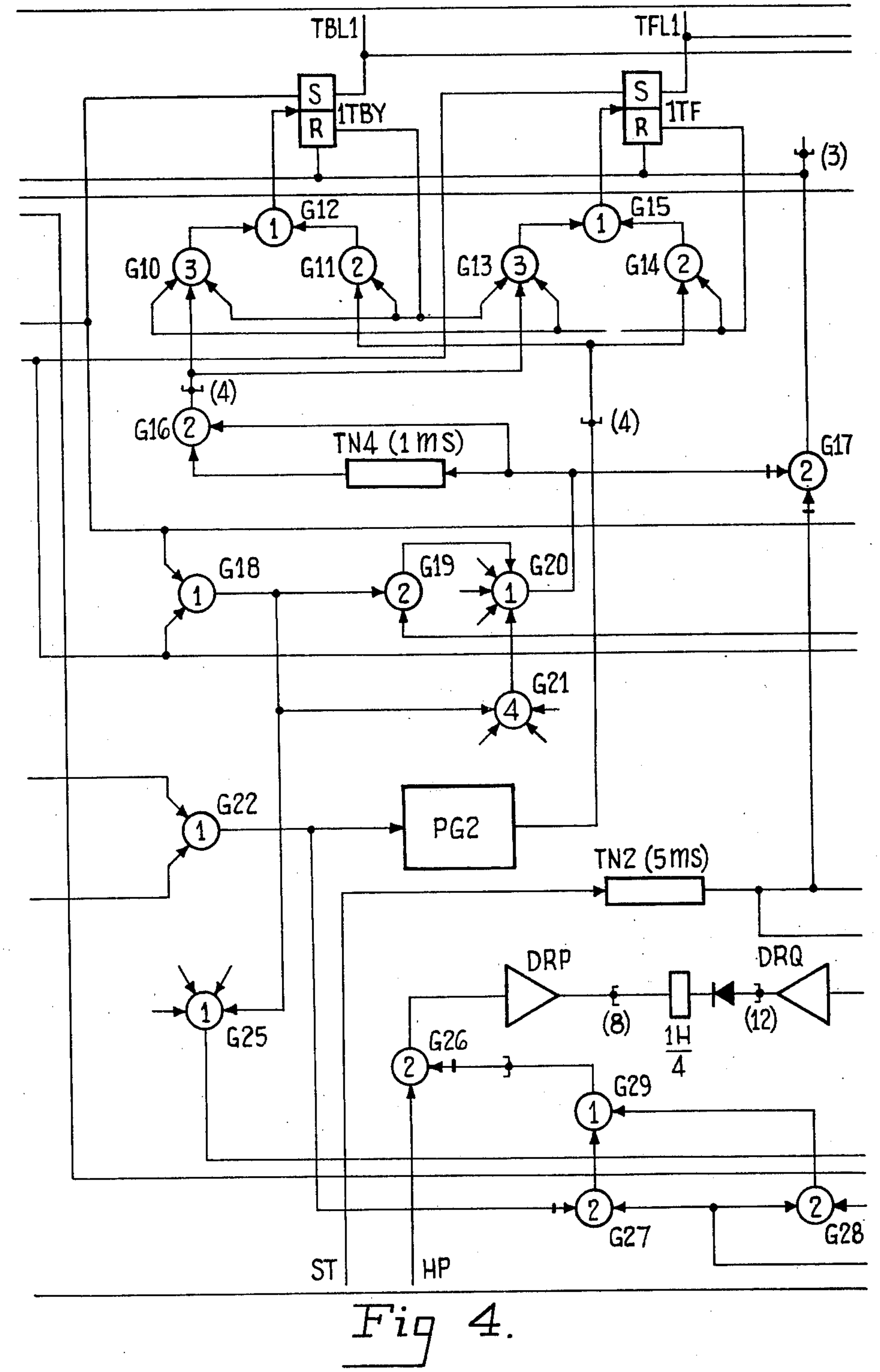

The arrangement of the contacts of relays 1H to 96H, 1RZ to 4RZ and 1RY to 4RY with reference to the H leads of the 384 switching-network outlets will now be discussed with reference to FIG. 3. For connection set-up and release purposes, the H leads of the network outlets are divided into four groups of 96. The individual outlets of the first group are connected to contacts 1H1 to 96H1 respectively of relays 1H to 96H; and the outlets of the second, third and fourth groups are likewise served by contacts 1H2 to 96H2, 1H3 to 96H3 and 1H4 to 96H4 respectively. Contacts 1H1 to 96H1 are connected to a common outlet-marking wire extending to contacts 1RZ1 and 1RY1 of a particular function-discriminating relays 1RZ and 1RY; contacts 1RZ1 and 1RY1 being supplied from −100v and +5v sources respectively over resistors R1 and R2 as appropriate. Contacts 1H2 to 96H2, 1H3 to 96H3 and 1H4 to 96H4 are associated with separate common outlet-marking wires extending to contacts 2RY1 and 2RZ1, 3RY1 to 3RZ1 and 4RY1 to 4RZ1 of other pairs of function-discriminating relays; contacts 2RZ1, 3RZ1 and 4RZ1 being supplied with −100v over resistors R3, R5 and R7 respectively whereas contacts 2RY1, 3RY1 and 4RY1 are supplied with + 5v over resistor R4, R6 and R8 respectively.

The −100v and +5v supply sources are used in the setting-up and release of network connections respectively. Accordingly in the setting up of a network connection, the particular outlet is nominated by operation of one of relays 1H to 96H and one of the relays 1RZ to 4RZ so that the H conductor of the outlet is uniquely marked from the −100v supply. On the other hand, to effect the release of an established connection by the marking of the appropriate network outlet from the +5v supply, the operation of an appropriate one of relays 1H to 96H and the appropriate one of relays 1RY to 4RY is required. The −100v marking connections derived over contacts 1RZ1 to 4RZ1 may conveniently be referred to as "Z" markings, and +5v marking conditions derived over contacts 1RY1 to 4RY1 may be referred to as "Y" markings.

The marker includes two voltage-sensitive detectors ZMD and YMD which are responsive to "Z" and "Y" markings respectively at any of the common outlet marking leads. Moreover the marker incorporates four additional pairs of voltage-sensitive detectors 1BD/1FD, 2BD/2FD, 3BD/3FD and 4BD/4FD. Detectors 1BD and 1FD are duly to be concerned with detection of busy and free (idle) conditions respectively at the H wire of any predetermined outlet of the first group; and the other pairs of detectors are similarly concerned with outlets of the remaining groups of 96.

SETTING UP A NETWORK CONNECTION

The overall management of the telecommunications switching centre or exchange, including the particular switching network is controlled by a stored-programme data-processing equipment involving "map" interrogation and connection nomination functions. Accordingly when the data-processing equipment has accumulated routing information requiring a connection to be set up over the four stages of the switching network (which may be one of a plurality incorporated in the exchange) it consults the map and decides precisely which connection is to be used. Thereupon the distributor appropriate to the marker is accessed by the processing equipment, and particular leads of the input path DIST are marked by a "1" signal. The leads concerned are a) the start lead ST, b) lead SU to signify the setting-up of a connection is required, c) one of 12 leads HP and one of eight leads HQ to define a particular H relay (serving one network outlet of each of the four groups of 96), d) one of four leads such as YZ, and *e*) one of each of the groups of leads MDL, MCL, MBL and MAL for the control of specific inlet (column) marking devices of the switching network. The "1" condition received at the start lead ST is effective in causing the output of timing element TN2 to assume the "0" state for a period of 5 m.s. so that gate G17 is primed. Moreover the "0" is applied to the input of timing device TN3 to ensure that the latter is reset and will duly perform its 50 m.s. timing function. When gate G17 is opened it applies a "1" signal to the reset lead of the eight pairs of toggles so that any which were hitherto in the set state are reset. The combined delay period of 55 m.s. of the two timing devices represent the maximum period allowed for the successful setting-up of a network connection.

The "1" condition received at lead SU (signifying setting-up of connection is required) is effective, in conjunction with reception of "1" at any predetermined one of the four leads such as YZ, in preparing for operation of a particular one of relays 1RZ to 4RZ. Thus assuming that lead YZ which is shown is marked by "1", relay 1RZ is prepared for operation over gate G31 and driver DRZ which are individual to that relay. The "1" condition at lead SU also causes OR gate G34 to produce a "1" output, and this together with the "1" condition at the particular lead YZ primes gate G35 (one of four) preparatory to operation of an H relay to be defined.

The network outlet which is to be defined for use in the connection to be set-up will be identified by operation of one of the 96 relays 1H to 96H and one of the four relays 1RZ to 4RZ, and the operation of the particular one of the first mentioned relays is determined by a "1" condition received at one of the 12 leads such as HP and one of the eight leads such as HQ. Assuming that relay 1H is prescribed for use, then the "1" condition is applied to the HP and HQ leads shown in the drawing. Accordingly driver DRP is actuated by way of gate G26 (one of 12) so that a particular potential is applied to the left-hand side of coils of one ordinate of eight of the relays 1H to 96H. Moreover the "1" condition at the particular HQ lead is effective in causing gate G37 to apply a "1" to driver DRQ. The latter produces an output potential which is applied to the right-hand side of coils of a particular ordinate of 12 of the 96 relays. The potentials from the drivers DRP and DRQ are such that the required relay, i.e. 1H, is operated.

With relay 1H operated, contacts 1H1, connect the busy detector 1BD and the free detector 1FD to the H conductor of that outlet OS which is nominated for use in the required network-connection. Likewise contacts 1H2, 1H3 and 1H4 connect corresponding pairs of detectors 2BD/2FD, 3BD/3FD and 4BD/4FD to the H conductors of three other network outlets which are merely to be interrogated. The four pairs of detectors enable the states (busy or free) of the particular outlets to be assessed in that a busy or free detector is actuated according to whether the related outlet is encountered busy or free respectively. In the normal course of events, the states of the outlets will correspond to the states of the relevant storage devices of the map in the data-processing equipment and in particular the outlet OS nominated for use should be identified as free (not in use) due to −50v extending to the H lead over resistor RH and diode DH. The actuation of the free detector 1FD, in these circumstances, confirms the validity of the map state in respect of the required network outlet; the "1" condition produced by the detector is extended to the set input of the related "free" toggle 1TF and to input leads of OR gate G18 and AND gate G31. Gate G18 produces "1" at its output lead so that gate G19 already primed to the "1" condition of lead YZ, now extends "1" to the common OR gate G20. The "1" condition now forthcoming from gate G20 starts the 1 m.s. timing device TN4 which is to be concerned with the "strobing" of the four pairs of toggles such as 1TBY/1TF. The "1" signal obtained from gate G20 inhibits gate G17 which removes the reset signal from the eight pairs of toggles. Meantime gate G31, already primed by "1" signals derived from lead YZ and the individual lead SU, is actuated by the "1" output of detector 1FD so that operation of relay 1RZ is initiated by way of driver DRZ.

As already mentioned when relay 1H operated, three network outlets in addition to outlet OS were concurrently interrogated as regards their idle or free states. Therefore the prevailing states of said three outlets determines whether the relevant busy detector 2BD, 3BD or 4BD or the relevant free detector 2FD, 3FD, or 4FD is actuated; and each actuated detector causes a "1" condition to be applied to the set-side input lead of the related one of the busy toggles (2TBY, 3TBY and 4TBY) or the related one of the free toggles (2TF, 3TF and 4TF).

With relay 1RZ duly operated, to the exclusion of relays 2RZ, 3RZ and 4RZ, contacts 1RZ1 advance a "Z" marking (−100v at resistor R1) to the lead which is common to contacts 1H1 to 96H1. This common lead is connected to input leads of the "Z" and "Y" marking detectors ZMD and YMD and in the present instance is extended over contacts 1H1 to exclusively mark the H-wire of outlet OS which is required to be used in the network connection to be set up. The output marking which is the first marking to be applied to the switching network is effective in backing-off diode DH.

It may be noted the detector ZMD responds to closure of contacts 1RZ1, by applying a "1" signal to gate G22 which in turn inhibits gate G27 to prevent actuation of the latter under possible forced-released conditions. Gate G27 therefore ensures that under the latter conditions the correct releasing sequence of relays 1RZ and 1H, in that order, is assured.

Reverting to consideration of the timing device TN4; its output lead and that of gate G20 are connected to respective input leads of AND gate G16. With this arrangement, a "1" output signal from gate G16 is produced at the end of the 1 m.s. period, and is effective in causing gates G10 and G13 and three corresponding pairs of gates to produce "1" outputs; gates G10 and G13 being related to toggles 1TBY and 1TF whereas the other pairs of gates are similarly related to the pairs of toggles 2TBY/2TF, 3TBY/3TF and 4TBY/4TF respectively. Gates G10 and G13 actuate gates G12 and G15 respectively and these apply strobe inputs to toggles 1TBY and 1TF respectively which at present are in the reset states. The other three pairs of gates such as G10 and G13 are similarly effective in relation to the other pairs of toggles. Since detector 1FD is presently applying a "1" signal to the set-side input lead of the "free" toggle 1TF and a "0" signal is evident at the set-side input lead of the "busy" toggle 1TBY, the aforesaid strobe signal causes toggle 1TF to assume the set state whereas toggle 1TBY remains in the reset state. Lead TFL1 therefore goes to the "1" state whereas lead TBL1 remains at "0"; the condition of the two leads signifying that the free state of network outlet OS is in conformity with the state of the related storage element of the processor map.

It can be deduced that in the present example with relay 1H operated, the encountered states of the three additional network outlets, which are being monitored over contacts 1H2, 1H3 and 1H4, are recorded, on the advent of the strobe pulse, by the relevant pairs of toggles. Thus any of the outlets which is encountered busy causes the relevant busy toggle to be set, and any outlet which is encountered idle causes the relevant free toggle to be set. It follows that the encountered state of the four network outlets are indicated by the state of leads TBL1/TFL1, TBL2/TFL2, TBL3/TFL3 and TBL4/TFL4 associated with the different pairs of toggles, preparatory to the information being employed in the scanner.

In the meantime the required outlet OS of the network has been marked by connection of −100v to the H conductor, and the distributor has causes a "1" condition to be applied to leads MDL, MCL, MBL and MAL to further define the required path through the switching network. Accordingly the related gates GD3, GC3, GB3 and GA3 are primed.

In the absence of any impediment, the −100v marking, uniquely applied to the H conductor of outlet OS, activates the double-switch detector DETD; the marking extending over a multiplicity of paths, typified by the coil of relay D and its marking diode DD, to the detector via isolating diodes such as DP. The paths involved are appropriate to coils of those crosspoint relays which are relevant to the defined matrix switch outlet and are equal in number to the number of inlets at each switch of the D stage. None of the D crosspoint relays is caused to operate at this juncture, but activation of the detector causes gate GD1 to apply a "1" signal to the 1 m.s. timing device TND and to the associated gate GD2. The latter produces a "1" signal when the delay period of device TND matures, and this signal is extended to an input lead of gates such as GD3 which are provided on the basis of one for each lead such as MDL. The particular gate GD3 which was primed by a "1" condition at the related lead MDL is exclusively activated, and this operates the related marking device (driver) DRMD. Device DRMD therefore applies a marking potential (−80v), over the individual isolating diode DT and thence over diodes such as DD, to the crosspoint relay coils of the matrix inlet (column) appropriate to the nominated link LKC-D; said marking potential being likewise applied (although ineffectually) to other matrix switches of the D-stage of the network.

It is also important to note that last-mentioned marking potential is applied over the isolating diode DE to the D-marking detector DMD which is common to all the inlet marking wires of the D-stage. Detector DMD responds to the marking by producing a "1" signal at its output lead which is connected to the set-side input lead of toggles TDD and TD, and to an input of pulse generator PG1. The latter, after a period of 0.5 m.s., extends a short-duration "1" signal to the strobe input leads of toggles TA, TB, TC and TD. In the present circumstances therefore, toggle TD assumes the set state and applies a "1" condition to lead LD.

The co-ordinate marking of the particular D-stage matrix switch, over the H conductor and the diode DD, brings about operation of the D crosspoint relay, which at contacts D2 and D3 connects the − and + leads of outlet OS to the link LKC-D. Relay D, at contacts D1, moreover extends a marking potential (−80v) to hold wire of link LKC-D whence it is advanced, over a multiplicity of branch paths involving C crosspoint relay coils and associated marking diodes DC, to the double-switch detector DETC via isolating diodes such as DQ.

The conditions are such that none of said C crosspoint relays are caused to operate, but, in the absence of any impediment detector, DETC responds to the marking potential forthcoming over contacts D1 and is effective upon the circuitry comprising gate GC1, delay element TNC (1 m.s.) and gates GC2 and GC3 in a similar manner to that which was performed by the corresponding circuit elements actuated by detector DETD. Consequently, after a delay of 1 m.s., the marking device (driver) DRMC, defined by the pre-selected lead MCL, causes a marking voltage (−70v) to be applied, over the isolating diode DU and thence by way of diodes such as DC, to the left-hand side of the column of C crosspoint relays appropriate to the required inlet of the C-stage matrix switch; the same marking condition being ineffectually applied to corresponding columns of crosspoint relays of the other switches of the stage.

The marking condition also actuates the C-marking detector CMD, over isolating diode DF, and this applies a "1" signal to the set-side input lead of toggle TC and moreover causes the pulse generator PG1 to be activated again. Accordingly after a delay of 0.5 m.s., toggle TC is caused to assume the set state, whereupon a "1" signal is applied to lead LC.

The completed co-ordinate marking of the required C crosspoint relay normally effects operation of that relay, so that contacts C2 and C3 further extend the − and + wires of the network outlet to link LKB-C. Furthermore contacts C1 connect a marking potential (substantially −70v) to the hold wire of link LKB-C from which it is extended over a multiplicity of branch paths involving B crosspoint relay coils and associated marking diodes DB to detector DETB, via appropriate isolating diodes DR.

Therefore detector DETB, of the B-stage of the network, is operative in the absence of any impediment, and the resultant "1" signal is effective over gate GB1, timing device TNB (1 m.s.) and gates GB2 and GB3 to cause actuation of the marking device DRMB (defined by the pre-selected lead MBL). Device DRMB produces a −60v output to complete the co-ordinate marking of the requisite B crosspoint relay. Device DRMB also operates the B-marking detector BMD so that the set-side input lead of toggle TB has a "1" signal applied to it concurrently with pulse generator PG1 being reactivated. After the 0.5 m.s. delay interval of device PG1, toggle TB is caused to assume the set state whereupon a "1" signal is applied to lead LB.

It is to be noted that, with gate GB1 activated by detector DETB, a "1" signal is applied to a pertinent input lead of OR gate GD1 so that, regardless of the possible premature restoration of the D-stage detector DETD, the states of the marking device DRMD and the D-marking detector DMD are maintained.

Upon operation of the B crosspoint relay, the network outlet is extended to link LKA-B, and contacts B1 apply, via the hold wire of said link, an outlet marking potential (substantially −60v) to the pertinent A-stage matrix switch outlet whence it is extended over the multiplicity of branch paths involving A crosspoint relay coils and marking diodes such as DA to detector DETA, by way of appropriate isolating diodes DS. The A-stage double-switch detector DETA thereupon responds, in the absence of any impediment, and its "1" output is effective, over gate GA1, timing device TNA (1 m.s.) and gates GA2 and GA3 to cause actuation by the marking device DRMA as defined by the pre-selected lead MAL. Device DRMA produces the final marking potential (−50v), and this is extended by way of diodes such as DA, to complete the co-ordinate marking of a defined crosspoint relay in the relevant A-stage matrix switch.

It is to be noted, that, with gate GA1 actuated by detector DETA, a "1" signal is applied to the pertinent input lead of OR gate GC1 so that, regardless of the possible premature restoration of detector DETC, the states of the marking device DRMC and the C-marking detector CMD (stage C) are maintained.

The marking potential produced by device DRMA is also applied via isolating diode DH to the A-marking detector AMD which responds by applying a "1" signal to the set-side input lead of toggle TA. The last-mentioned signal also causes the pulse generator PG1 to be re-activated so that, after a delay of 0.5 m.s., toggle TA is caused to assume the set condition, whereupon a "1" signal is connected to lead LA.

The co-ordinate marking of the particular A crosspoint relay enables that relay to operate so that the connection between the inlet IS and the outlet OS is completed by contacts A1, A2 and A3. At this juncture holding earth is evident at the H conductor of the inlet, and, when contacts A1 close, a series holding path is provided for relays D, C, B and A to the negative marking condition (−100v over resistor R1) at the H conductor of the network outlet OS. The resultant change-of-state at various points along the holding path causes detectors DETA and DETB to release; detectors DETC and DETD are also released if they have not already done so. With detector DETA released, gate GA1, timing device TNA, gates GA2 and GA3, the marking device DRMA and the A-marking detector AMD are restored to their quiescent states; and, with detector DETB released, corresponding components appropriate to stage B are similarly restored. Thus the output leads of gates GA1 and GB1 are reverted to the "0" condition by the release of detectors DETA and DETB respectively, so that gates GC1 and GD1 are now inhibited regardless of whether detector DETC and DETD are released due to closure of contacts A1, or previously as may occur under adverse circuit-tolerance conditions. Accordingly, the timing device TNC, marking device DRMC and the B-marking detector, appertaining to stage-B, are disabled by gate GC1, whereas corresponding devices of stage-D are disabled by gate GD1.

With gates GA1, GB1, GC1 and GD1 now producing "0" output signals, a "0" signal is applied to the inverted input leads of gates GA5, GB5, GC5 and GD5 respectively. The last three gates remain inhibited due to "0" conditions at leads PBCD, PCD and PD respectively, but the 2-input AND gate GA5 is activated by the "0" signal at its inverted input lead in conjunction with the "1" evident at lead LA. The OR gate G44 derives its inputs from gates GA5, GB5, GC5 and GD5, and, since gate GA5 is activated, gate G44 produces a "1" output signal at lead SSC to indicate that a connection (4-stage in the present instance) has been successfully accomplished.

The signal at lead SSC, by inhibiting the gate G31 causes relay 1RZ to release and this at contacts 1RZ1 removes the −100v marking potential from the H lead of outlet OS so that the crosspoint relays are now held from −50v over resistor RH and diode DH. As a result of the change of potential at the H lead of outlet OS, the busy detector 1BD is actuated and the free detector 1RD is released. Moreover the opening of contacts 1RZ1 is effectively monitored by detector ZMD which, due to the now persistent holding potential (−35v) at the H lead of outlet OS, produces a "0" output signal. The operation of busy detector 1BD applies a "1" condition to the set-side input lead of busy toggle 1TBY. As a result of the transition of the output of detector ZMD from "1" to "0" the pulse generator PG2 is activated so that, after a delay of 0.5 m.s., a short-duration pulse is produced at its output. This pulse duly causes a strobe pulse to be applied to each toggle of the four pairs of toggles 1TBY/1TF, 2TBY/2TF, 3TBY/3TF and 4TBY/4TF which is still in a reset state; the gates such as G11, G12, G14 and G15 being involved. Assuming, as is normally the case, that no change-of-state has taken place in respect of the three outlets of the set which were interrogated but not marked, the strobe pulse is ineffectual on all these toggles except 1TBY. The latter, having "1" at its set-side input lead is changed to the set state by the strobe pulse, so that a "1" condition is given at lead TBL1. Thus leads TBL1 and TFL1 presently appropriate to the used outlet OS are both marked by "1" whereas only one lead of each of the pairs of leads TBL2/TFL2, TBL3/TFL3 and TBL4/TFL4 presently appropriate to those of the three outlets which were merely interrogated is marked by "1" according to whether the outlet encountered was busy or free respectively.

It is to be noted that the persistent "0" signal derived from gate G22 removes the inhibit condition from gate G27 to allow for the release of relay 1H in the advent of a possible forced-release condition.

Figure 5:
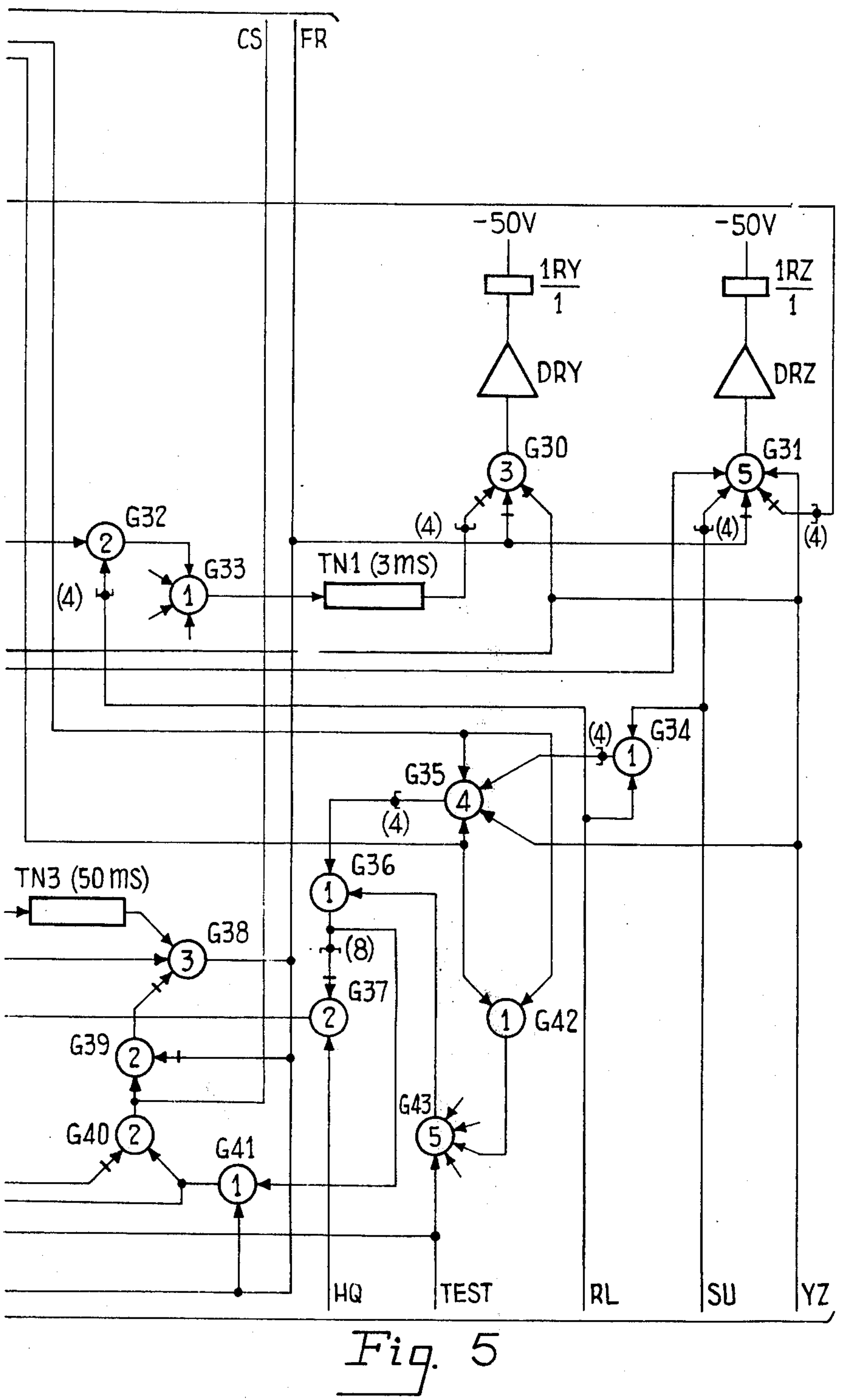

The normal release procedure for the marker as a result of the successful setting-up of a network-connection involves the use of one of four gates such as G35 (FIG. 5). Each of these gates has one input lead controlled from the associated (one of four) YZ leads, a second input lead controlled from the common SU lead and third and fourth input leads controlled from the set-side output leads such as TBL1/TFL1 of a relevant pair of toggles such as 1TBY/1TF. The particular gate G35 shown, already has its first and second input leads in their "1" condition. In the present instance of a connection involving outlet OS, the resultant set states of both toggles 1TBY/1TF, which are presently relevant to that outlet, ensure that "1" signals are presented exclusively to the said third and fourth input leads of the particular gate G35. Accordingly that gate produces a "1" output signal and this is repeated by gate G36 to an inverted input lead of each of the eight identical gates including gate G37. The latter which was concerned in the operation of relay 1H is therefore closed and the relay is released, and its contacts duly release all those of the free and busy detectors 1FD, 1BD, 2FD, 2BD, 3BD, 4FD and 4BD hitherto actuated. Thereupon each of the four gates such as G18 is closed, so that the OR gate G25 which is common to them produces a "0" signal. This opens gate G40, which had already been primed by gate G41 due to the previously-mentioned actuation of gate G36. The "1" signal now evident at the output lead of gate G40 is applied to lead CS of the marker output path SCAN, and is also effective in opening gate G39 which applies "1" to the inverted input lead of gate G38. The latter therefore cannot be actuated, when the delay period of timing circuit TN3 eventually matures, and so the application of a "forced-release" condition "1" to lead FR at that time is prevented.

The "1" signal, applied to lead CS of the scanner constitutes a demand for the latter to communicate the data present on the remaining output leads to the data-processing equipment, the data being accompanied by other data identifying the particular marker.

In the foregoing example, where the 4-stage connection was successfully accomplished together with the clearance of the marker; outlet OS as defined jointly by relays 1H and 1RZ, was employed so that leads TBL1 and TFL1 are now at the "1" state. However the states of the pairs of leads TBL2/TFL2, TBL3/TFL3, and TBL4/TFL4 are determined by the encountered states of three outlets which were interrogated (but not marked) concurrently with outlet OS. If we assume that the three outlets, which were interrogated over relay contacts 1H2, 1H3 and 1H4 were encountered busy, busy and free respectively then the complete signal-message communicated to the scanner/distributor over path SCAN is as follows:

| LAA | LA | ASD | LBB | LB | BSD | LCC | LC | CSD | LDD | LD | DSD |
|---|---|---|---|---|---|---|---|---|---|---|---|
| 0 | 1 | 0 | 0 | 1 | 0 | 0 | 1 | 0 | 0 | 1 | 0 |
| TBL1 | TFL1 | | TBL2 | TFL2 | TBL3 | TFL3 | | TBL4 | TFL4 | FR | |
| 1 | 1 | | 1 | 0 | 1 | 0 | | 0 | 1 | 0 | |

The "0" condition at leads LAA, LBB, LCC and LDD and at leads ASD, BSD, CSD and DSD indicates that none of certain possible conditions of fault were found at stages A, B, C and D during the setting up procedure. The "1" condition at leads LA, LB, LC and LD indicates that the connection involved four network stages. The "1" signal at leads TBL1/TFL1 indicates the first outlet of a set of four, i.e. an outlet interrogated over one of contacts 1H1 to 96H1, was employed successfully in the connection. The "1" and "0" signals respectively at leads TBL2/TFL2 indicate that the second outlet of the set is busy, and the condition of leads TBL3/TFL3 indicates the same situation with respect to the third outlet of the set. The "0" and "1" signals respectively at leads TBL4/TFL4 indicates that the fourth outlet of the set, interrogated over one of contacts 1H4 to 96H4, was encountered free.

The first 12 bits of any signal message, appertaining to any four-stage connection successfully completed, is always the same when no fault conditions are encountered, but it can be deduced that states of the succeeding four pairs of bits is available according to which one of the four outlets of a set is used for the connection and according to the encountered states of the other outlets of the set. Thus if the second outlet of any set were used and the remaining outlets of that set were encountered busy, the relevant part of the message would be:

| TBL1 | TFL1 | BL2 | TFL2 | TBL3 | TFL3 | TBL4 | TFL4 |
|---|---|---|---|---|---|---|---|
| 1 | 0 | 1 | 1 | 1 | 0 | 1 | 0 |

However the complete message is promptly communicated to the data processing equipment whereupon amongst other activities said equipment is enabled to take such action as may be necessary in the event of any disparity which may exist between the states of the four outlets (including the three which were merely interrogated) and the states of corresponding storage elements of map included in the processor.

It will be appreciated the marking function performed in the setting up of any network connection is always accompanied by the interrogation of a particular combination of three additional outlets so that detection of any disparity between a network outlet and the relevant storage element of the processor map is likely to be detected before an outlet is nominated for use in a connection as a result of map interrogation.

It will also be appreciated that the marker can readily be adapted to interrogate other than three additional outlets. For example, in another network configuration, if five such additional outlets were to be catered for, then the relays such as 1H would be provided with six outlets and moreover six pairs of relays such as 1RY and 1RZ, six pairs of toggles such as 1TBY and 1TF and six pairs of busy and free detectors would also be provided.

When the marker has completed its functions, such as those described above, the distributor maintains the states of the leads of the input path. When the marker is again required to be used, the ST lead is changed to a "0" state, by the distributor, and data relevant to next operational requirement of the marker is applied to the leads of the input path preparatory to the marker being re-started by re-institution of a "1" signal at lead ST.

RELEASE OF A NETWORK CONNECTION

The marker is used to effect the release of any predetermined network connection in accordance with instructions delivered to the distributor by the data-processing equipment. Thereupon the distributor updates the signalling conditions prevailing at the conductors of the marker input path DIST culminating in the reinstatement of "1" at start lead ST. Of the other conductors those which receive a "1" signal are lead RL to define that a connection-release function is required, one of the twelve leads HP and one of the eight HQ leads to define a particular one of the relays 1H to 96H and one of the four leads YZ which, in conjunction with lead RL, is to define that a particular one of relays 1RY to 4RY is to be operated. All other leads of the path have "0" signals applied to them.

It will be assumed that the network connection employing outlet OS is required to be released. Therefore, as in the particular connection procedure hereinbefore described, the particular HP, HQ and YZ leads shown in the drawing are employed. As in the setting-up procedure, the start signal "1" at lead ST causes those of all the toggles (eight pairs) which are in the set state to be promptly reset due to the action of timing device TN2 which also duly starts the timing device TN3 for possible generation of a forced-release condition. Relay 1H is operated as previously described by "1" signals at the particular leads HP and HQ and thereupon contacts 1H1, 1H2, 1H3 and 1H4 present the pairs of busy and free detectors 1BD/1FD, 2BD/2FD, 3BD/3FD and 4BD/4FD to the H conductors of the same four network outlets (including outlet OS) as before.

Since outlet OS is busy, i.e. used on the network connection which is to be released, the busy detector 1BD is actuated to the exclusion of 1FD. In respect of the remaining three outlets which may be busy or free the relevant busy or free detector is actuated. Detector 1BD prepares for the setting of toggle 1TBY whereas one toggle of each of the pairs 2TBY/2TF, 3TBY/3TF and 4TBY/4TF is prepared for setting according to the detected states of said remaining outlets. The busy detector 1BD also activates gates G18 and G32 which appertain thereto, the latter gate having been primed by "1" at lead RL. Gate G18 is effective, over gate G18 and G20, in causing timing device TN4 to extend a strobe pulse to the four pairs of toggles 1TBY/1TF, 2TBY/2TF, 3TBY/3TF and 4TBY/4TF after a 1 m.s. delay. Accordingly toggle 1TBY, appertaining to outlet OS, is set, and the prepared toggle of each of the three other pairs is also set. Meantime gate G32 activates gate G33 to start the timing device TN1 which promptly activates gate G30 for a period of 3 m.s. Relay 1RY therefore operates for this period over gate G30 and driver DRY; gate G30 having been primed by "1" at a particular lead YZ. When relay 1RY operates, contacts 1RY1 extend +5v, at resistor R2, to the H lead of outlet OS exclusively and this constitutes the condition for releasing relay A, B, C and D of the network connection concerned. Accordingly that connection is released during the period of operation of relay 1RY.

When relay 1RY releases, due to timing device TN1 reapplying a "1" signal to gate G30, the opening of contacts 1RY1 allows detector 1BD to release and detector 1FD to operate, the latter being effective to apply a "1" signal to the set-side input lead of toggle 1TF. Contacts 1RY1 also cause detector YMD to produce a "1" output which is operative over gate G22 to cause the pulse generator PG2 to generate a short-duration pulse after a period of 0.5 m.s. This causes a strobe pulse to be applied to the four pairs of toggles such as 1TBY/1TF over gates such as G11 and G14. In the present instance, since the set-input side of toggle 1TF is at "1", the toggle is set.

The situation in respect of the pairs of toggles 1TBY/1TF, 2TBY/2TF, 3TBY/3TF and 4TBY/4TF is that leads TBL1/TFL1 relevant to the first pair are at the "1" state to signify the outlet OS encountered busy has now gone to the free condition, whereas the states of the other pairs of leads is determined by the prevailing states of the other three network outlets which were merely subjected to interrogation. Assuming that the outlets appertaining to pairs of toggles 2TBY/2TF, 3TBY/3TF and 4TBY/4TF were busy, busy and free respectively then the signals presented to the marker output path in respect of the four outlets would be:

| TBL1 | TFL1 | TBL2 | TFL2 | TBL3 | TFL3 | TBL4 | TFL4 |
|---|---|---|---|---|---|---|---|
| 1 | 1 | 1 | 0 | 1 | 0 | 0 | 1 |

Obviously if another outlet of the set of four had been the subject of the connection-release function then the pair of leads appropriate thereto would have "1" signals evident at them whereas the signals at each of the other pairs of leads would be "1" and "0" or "0" and "1" according to the busy or free state respectively of the outlet.

Reverting to the situation obtaining as the result of the network-connection involving outlet OS; the "1" outputs of toggles 1TBY/1TF are effective over gate G35 in the manner already described to release relay 1H by disabling gate G37. Upon the release of relay 1H, the free detector 1FD is released together with one of each pair of detectors 2BD/2FD, 3BD/3FD and 4BD/4FD. Detector 1FD thereupon closes gate G18 which in the manner already described applies a "1" signal to the call-scanner lead CS, and prevents a "1" signal being applied to the forced release lead FR by the timing device TN3. The signal at lead CS causes the scanner to report the states of all the remaining leads of said output path SCAN to the data-processing equipment. Since the marker has been concerned in the release of a network connection leads LAA, LA, ASD, LBB, LB, BSD, LCC, LC, CSD, LDD, LD and DSD are in the "0" state, but of course the "1" state of leads TBL1/TFL1 in this instance enables the data-processing equipment to determine that release of the requisite connection has been successfully accomplished. Concurrently as in the case of the setting-up of the connection, the state of leads TBL1/TFL1, TBL2/TFL2 and TBL3/TFL3 enables map parity to be checked in respect of the other three network outlets which were merely interrogated.

TESTING OF A SET OF FOUR NETWORK OUTLETS

From all the foregoing description it will be understood that each setting-up and release of each network-connection enables a plurality of outlets, additional to the one of the connection, to be assessed and reported upon. In each case the additional outlets are in the set defined by that one of relays 1H to 96H which is operated. The marker provides the facility whereby all outlets of any set may be assessed and reported upon at a time when the setting-up or release of a connection is not needed. The facility may be invoked when all the various sets of outlets are required to be successively checked against the processor map, say during periods of light traffic, or when a disparity is suspected as between the map and one outlet of a particular set.

In any event, when the data-processing equipment institutes a demand for the facility, the existing state of the leads of the marker input path DIST is up-dated, by the distributor, so that particular leads HP and HQ have "1" signals applied to them to signify which of relays 1H to 96H is to be operated. Lead TEST also has "1" applied to it to signify that a monitoring function only is required. As in the previously described uses of the marker, the state of start lead ST is changed briefly to the "0" condition preparatory to starting the marker. When lead ST returns to the "1" state, all the toggles are promptly forced to the reset state by timing device TN2 which also starts the possible forced-release function involving timing device TN3. The "1" signal at lead TEST primes gates G43 and G28 which are concerned with the normal and forced-release functions respectively of the marker. Assuming again that relay 1H has been defined for use, the closure of its contacts connects the four pairs of busy and free detectors to the network respective outlets, and one of each said pair is actuated according to the encountered state of the relevant outlets.

Each of those of toggles 1TBY to 4TBY which are appropriate to a busy outlet now has a "1" signal connected to its set-side input lead, whereas each of toggles 1TF to 4TF which is appropriate to a free outlet has "1" connected to its set-side input lead. Gate G18 relevant to each said pair of detectors is activated and the four pairs of toggles are strobed as previously described so that one of each pair is set to provide significant (busy or free) signals "1" at the relevant ones of leads TBL1 to TBL4 and TFL1 to TFL4. Accordingly four gates such as G42, are opened so that gate G43, primed by the "1" at lead TEST, is actuated. This actuates gate G36 which disables gate G37 to cause relay 1H to release. The activated free and busy detectors are released by relay 1H and thereupon four gates such as G18 close. Consequently gate G25 is closed and so gate G40 is actuated to prevent the forced-release condition maturing. Gate G40 also causes a "1" signal to be applied to the call-scanner lead CS, so that the scanner is rendered operative, as before, to cause the signals now evident at all the remaining marker output leads to be communicated to the data-processing equipment.

SHORT-PATH NETWORK CONNECTIONS

The marker caters for short-path connections over the network which involve switching stage D, stages C and D, and stages B, C and D, leads PD, PCD and PBCD, respectively, being exclusively marked by a "1" signal when such a connection is required. The need arises when certain D, C and B switch inlets are connected to routes or equipments (instead of to inter-stage links) which may require to be switched to outlets such as OS of the network. Taking the example of a short-path connection involving stages B, C and D, the conditions applied by the distributor to the input path DIST for the setting up of a connection are the same as for a four-stage connection except that none of leads such as MAL has a "1" signal applied to it, but a "1" signal is applied to lead PBCD. The latter signal prepares gate GB5. The marker now proceeds to function in the manner of a normal four-stage connection as a result of appearance of "1" at the start lead ST: the requisite crosspoint relays D, C and B being duly operated in sequence. The marking potential presented by driver DRMB to operate the relay B, meantime conditions toggle TB preparatory to the latter being transposed to the set state when the strobe duly occurs.

When relay B operates to complete the particular short-path connection, the closure of contacts B1 provides the holding condition (earth over a resistor equivalent in value to a crosspoint relay coil) whereupon detector DETB is restored. From this point the procedure is identical with that described with reference to setting up a four-stage connection except that the release of the operated one of relays 1RZ to 4RZ is effected by actuation of gate GB5 (instead of gate GA5) when toggle TB is set by the strobe pulse. The information duly accepted by the scanner for transmission to the data processing equipment is signified as relating to a three-stage connection since of the four leads LA, LB, LC and LD only the last three provide "1" signals. The two-stage and one-stage short-path connections are dealt with in a similar manner except the release of the relay such as 1RZ is effected by primed gate GC5 or GD5 respectively when the connection has been completed. In the case of a two-stage connection the holding earth at the inlet H lead is applied over a resistor equivalent in value to two crosspoint relay coils in series, whereas in the case of a one-stage connection the resistor is equal to three such coils.

OVERLAY NETWORK-CONNECTIONS

Short-path connections involving network stage D only or stages B, C and D may be used for example, in those circumstances when a manual board circuit or other functional circuit terminated on an outlet of the network is required to be switched into an existing four-stage connection. The intruding connections are referred to as overlay connections, and when a three-stage connection of this kind has been setup, the potential at the H-lead of the link LKA-B of the original connection is such as to enable that connection and the overlay connection to be maintained.

On the other hand when a one-stage overlay connection is established, relay D of the overlay connection is maintained in series with relays A, B and C of the original connection (initially from -100v) but the D relay of the latter is caused to release. The original connection is therefore effectively released in favour of the overlay connection supplemented by the path provided over relays A B and C of the original connection.

It will be understood that, as regards overlay connections, the original and overlay connections converge over different outlets to the same inlet of a particular switch; being a B-switch in the first example and a D-switch in the second.

DETECTION AND REPORTING OF FAULTS

Although the components of the switching network and the marker are required to be of a high order of reliability, the possibility of failure of a component or function at any time must be catered for. Accordingly the marker is organised for the detection of fault conditions and for the reporting of them to the data-processing equipment so that appropriate action may be taken. A number of typical fault situations and the methods of reporting them will now be discussed.

a. Short-Circuited Marking Diode

As already mentioned each crosspoint relay of each matrix switch of every stage of the switching network incorporates a marking diode. The marking diodes DD of stage D are collectively monitored by the short-circuit detector DSDD over isolating diodes DJ, whereas the marking diodes such as DC, DB and DA of stages C, B and A are monitored by detectors CSDD, BSDD AND ASDD respectively over the appropriate isolating diodes DK, DL and DM. The number of isolating diodes (such as DJ) is the same as the number of inlets of each switch (separately) of the particular network stage. If when a connection, e.g. a four-stage connection, has been set-up, one of the marking diodes DD, DC, DB or DA has developed a short-circuit or low resistance condition; the hold potential, at the relevant point of the through-connected H-conductor, is operative upon the pertinent one of detector DSDD, CSDD, BSDD, and ASDD which generates a "1" signal at lead DSD, DSC, DSB or DSA as appropriate.

When the marker is next taken into use for the setting-up or release of connection or for network-outlets testing purposes, the message appertaining to that function, and applied to the scanner over the marker output path, will incorporate a "1" at the relevant one of leads DSD, DSC, DSB or DSA; the signal also being repeated in each subsequent message delivered from the marker.

b. Relay (1H to 96H) Fails to Operate

This may arise due to failure of the marker or due to presentation of improper information, by the distributor, to leads HP and HQ, and may occur when the marker is required for a) the setting-up of a connection, b) the release of a connection, or c) for the mere testing of any set of four outlets. In any event, on the advent of a "1" signal at the start lead ST, any toggle of the eight pairs which was hitherto in the set condition is promptly reset due to timing device TN2. The latter, in presenting a "0" signal to timing device TN3 for 5 m.s., ensures that device TN3 is conditioned to institute its 50 m.s. timing function when the output lead of TN2 reverts to "1". Since none of relays 1H to 96H is operated, the output leads of all busy and free detectors 1BD/1FD, 2BD/2FD, 3BD/3FD and 4BD/4FD remain at "0" so that all the gates controlled thereby remain inoperative. Accordingly the operation of one of relays 1RZ to 4RZ does not mature in the case of the present demand being for a connection set-up, nor does one of relays 1RY to 4RY operate if the present demand were in respect of a connection-release function. Since gates G36, G41, G40 and G39 are not actuated, a "0" condition remains on the inverted input lead of gate G38, and the call-scanner lead CS remains at "0". When device TN3 produces a "1" output, on conclusion of its 50 m.s. timing function, a "1" is applied to the forced-release lead FR by gate G38. The last-mentioned signal activates gates G41 and G40 so that "1" is applied to the call-scanner lead. Therefore the scanner establishes communication with the data-processing equipment and since the message derived from all output-path leads, except FR, is constituted exclusively by "0" conditions, the data-processor is enabled to make an assessment of the nature of the fault.

c. Network Outlet of Demanded Connection Encountered Busy

When a connection has been nominated by the data-processing equipment for setting-up by the marker, it may happen, due to disparity between the map and the switching network, that the required network outlet is encountered busy when the relevant one of relays 1H to 96H is operated. In this event the busy detector 1BD, 2BD, 3BD, or 4BD now relevant to the required outlet is operated instead of the partner free detector 1FD, 2FD, 3FD or 4FD; one each of the remaining three pairs of busy and free detectors being actuated as normally according to the encountered state of the three outlets. Assuming that the required outlet is again OS and that the second, third and fourth outlets of the set (defined by contacts 1H2, 1H3 and 1H4 respectively) are busy, busy and free respectively; then the set input sides of the busy toggles 1TBY, 2TBY and 3TBY and of the free toggle 4TF have "1" applied to them. The related four gates such as G18 are all actuated so that timing device TN4 promptly extends a strobe pulse to the four pairs of toggles 1TBY/1TF, 2TBY/2TF, 3TBY/3TF and 4TBY/4TF. As a result of the toggles 1TBY, 2TBY, 3TBY and 4TF are set to institute the following signalling pattern at the related leads of the marker output path:

| TBL1 | TFL1 | TBL2 | TFL2 | TBL3 | TFL3 | TBL4 | TFL4 |
|---|---|---|---|---|---|---|---|
| 1 | 0 | 1 | 0 | 1 | 0 | 0 | 1 |

Also, because busy detector 1BD has been operated, instead of the free detector 1FD, relay 1RZ is prevented from operating so that no attempt is made to present a "Z" -marking (−100v) to inlet OS or to the Z-marking detector ZMD. Gate G35 appertaining to the pair of toggles 1TBY/1TF remains inoperative due to there being "1" and "0" at leads TBL1 and TFL1 respectively, and, with the situation now persisting, gates G36, G41, G40 and G39 remain closed. Accordingly gate G38 is not inhibited, and when timing device TN3 (50 m.s.) duly produces a "1" output signal it is passed to the forced-release lead FR whereupon gates G27, G29 and G26 are disabled to cause the operated one (1H) of relays 1H to 96H to release. The "1" condition presented to lead FR of the marker output path is effective, when all busy and free detectors have attained the released state due to the release of relay 1H, in causing a "1" signal to be presented to the call-scanner CS whereby the scanner establishes communication with the data-processing equipment and proceeds to transmit the message present at the marker output path. The first 12 bits of the message appropriate leads LAA, LA, ASD, LBB, LB, BSD, LCC, LC, CSD, LDD, LD and DSD are constituted exclusively by "0" signals whereas the last eight bits are as defined above; and since "1" is not present at both leads TBL1 and TFL1 the indication is that the nominated connection was not set-up due to a busy condition being encountered on the required outlet.

d. Open-Circuit Marking Diode or Crosspoint Relay-Coil Winding

When the network marking function in respect of say a four-stage connection have been instituted by the marker, the sequential operation of the nominated D, C, B and A relays (in that order) may be impeded by an open-circuit (disconnection of a marking diode or a relay coil at one of the crosspoints concerned. Assuming that such a situation is encountered in respect of the particular B-switch crosspoint (FIG. 1) of the drawing; the setting-up process (involving typically network-outlet OS) proceeds to the point where marking device DRMB has been actuated due to the response of detector DETB to the marking presented over contacts C1. In the interim, toggles TD and TC have been successively set to mark the related output-path leads LD and LC with a "1" signal. In the present instance however, when device DRMB is actuated, although it causes toggle TB to be set, through the intermediary of pulse generator PG1, it cannot operate relay B due to the said diode or coil being defective. Therefore relay A is not enabled to operate nor is toggle TA enabled to be set. It follows that gates GA5 and G44 remain closed, and lead SSC remains at "0" signifying that the connection is incomplete. The operated relay IRZ is not released as normally, due to the condition of lead SSC. Accordingly toggle 1TBY is not changed to the set state as it was in the case of a successful connection. Therefore the pertinent gate G35 (awaiting "1" signals from toggles 1TBY and 1TF) is not actuated and the forced-release condition ("1" at lead FR) is allowed to mature by way of gate G38. The "1" (forced-release) signal derived from gate G38 brings about the release of relay IRZ and causes gate G41 to apply "1" to lead MRCE which is the strobe lead for toggles TAA, TBB, TCC and TDD. Since the set-side input leads of toggles TBB, TCC and TDD are receiving a "1" signal from detectors BMD, CMD and DMD, it follows that these toggles assume the set state; toggles TB, TC and TD having already been set.

When relay 1RZ releases, the partially set-up network connection is released, and moreover detector ZMD responds by causing gate G22 to produce a "0" signal which enables gate G27 (primed by the output of gate G38) to bring about the release of the operated one (1H) of relays 1H to 96H. At this juncture all the pairs of busy and free detectors are in the restored state. However the last of them to be restored causes the relevant gate G18 to close, and this disables gate G25 which allows gate G40 to apply a "1" signal to the call-scanner lead CS. The scanner is now operative in transmitting the following message to the data-processing equipment:

The message by the bits relevant to pairs of leads TBL2/TFL2, TBL3/TFL3 and TBL4/TFL4 presupposes that the three outlets of the set which were merely interrogated were encountered busy.

e. Short-Circuited Crosspoint Holding Contact

A short-circuited holding contact such as A1, B1, C1 or D1 may not interfere with the successful setting up of network connection involving the faulty crosspoint. However during the course of setting-up the connection, the condition of fault enables the double-switching detectors of two successive network stages to be actuated concurrently. As as result of this the marking detector DMD, CMD, BMD or AMD of the stage relevant to the faulty crosspoint is prevented from operating because the relevant marking device (driver) is inhibited by the actuated double-switching detector of the next (leftward) stage. Therefore, the toggle TD, TC, TB or TA (of the fault stage) remains unset to leave "0" at the related lead LD, LC, LB or LA of the marker output path. The situation does not give rise to generation of a forced release signal, and the message transmitted to the data-processing equipment is the same as would have been in the case of a fault not being encountered, except that the signal appropriate to lead LD, LC, LB or LA is "0" instead of "1".

f. Double-switching at an Inter-stage Link.

It may be that due to incorrect information being derived from the map of the data-processing equipment, one of the links of an existing network-connection is nominated for use in a connection which the marker is called up to set-up. As was described in Specification No. 1,293,441, the double-switch detectors DETD, DETC, DETB and DETA are provided for this emergency in that the holding potential already standing at the H-wire of a busy link prevents the relevant detector from responding to the marking potential which is forthcoming from the H-conductor of the marked outlet (row) of the stage. Accordingly the nominated marking device of the particular state is not activated, and the setting-up process is stopped. Moreover the marking detector DMD, CMD, BMD or AMD as the case may be is not actuated, so that the relevant toggle TD, TC, TB or TA respectively cannot be set.

Since the network connection is not completed (as evidenced by closure of contacts A1 in a four-stage connection) a "1" signal is not presented to lead SSC and a forced-release condition comparable with that described under heading e above is developed. This is followed by generation of a call-scanner signal whereupon the message appropriate to the state of the output path leads is transmitted to the data-processing equipment. A typical message is given below and relates a connection attempted from outlet OS with a double-switching condition evident at link LKB-C and presupposes that three network outlets, which were subjected to interrogation only, were encountered busy:

| | | | | | | | | | | | |
|---|---|---|---|---|---|---|---|---|---|---|---|
| LAA | LA | ASD | LBB | LB | BSD | LCC | LC | CSD | LDD | LD | DSD |
| 0 | 0 | 0 | 1 | 1 | 0 | 1 | 1 | 0 | 1 | 1 | 0 |
| TBL1 | TFL1 | | TBL2 | TFL2 | TBL3 | TFL3 | | TBL4 | TFL4 | FR | |
| 0 | 1 | | 1 | 0 | 1 | 0 | | 1 | 0 | 1 | |

| | | | | | | | | | | | |
|---|---|---|---|---|---|---|---|---|---|---|---|
| LAA | LA | ASD | LBB | LB | BSD | LCC | LC | CSD | LDD | LD | DSD |
| 0 | 0 | 0 | 0 | 0 | 0 | 0 | 1 | 0 | 0 | 1 | 0 |
| | TBL1 | TFL1 | | TBL2 | TFL2 | TBL3 | | TFL3 | TBL4 | TFL4 | FR |
| | 1 | 1 | | 1 | 0 | 1 | | 0 | 1 | 0 | 1 |

What we claim is:

1. A switching network, comprising a succession of link-connected stages each having a plurality of matrix switches formed by crosspoint relays, with control equipment, for effecting the setting-up and release of self-holding connections between any inlet and an outlet of the network and characterised in that said equipment has an incoming multi-conductor signalling-path for the reception of individual instruction messages including messages demanding the setting-up and release of specific network connections, an outgoing multi-conductor signalling-path for the transmission of status messages by said equipment, and marking arrangements which are operable either by a setting-up instruction message to selectively mark the outlet and all other salient points of the specified connection with potentials suitable for the establishment of that connection, or by a release instruction message to selectively and exclusively mark the outlet of a specified established connection with a potential such as to effect release of that connection.

2. A switching network with control equipment, as claimed in claim 1 in which the equipment also includes a plurality of network-outlet busy/free interrogation means and storage means for each said interrogation means, and the marking arrangements are so activated that, preparatory to the outlet of the specified connection being marked for setting-up or release purposes, each of a unique set of network outlets including the particular outlet is connected by operation of a predetermined relay means of a first category of relay means of said marking arrangements to a particular one of said interrogation means whereby a signal appropriate to the encountered free or busy state of each of said set of outlets is presented to and stored upon appropriate said storage means for utilisation over said outgoing signalling-path.

3. A switching network with control equipment, as claimed in claim 2 in which the equipment when employed for setting-up purposes is operative to mark the particular outlet as a result of that outlet being encountered in a free state and not otherwise; the marking potential being connected upon activation of a predetermined relay means of a second category of relay means of said marking arrangements, the number of relay means in the second category being equal to the number of outlets in each set.

4. A switching network with control equipment, as claimed in claim 3 in which the control equipment includes means to generate a signal when a connection has been successfully set-up and said signal is initially operative to restore said relay means of said second category for removal of said marking potential whereupon a signal appropriate to the now prevailing busy state of the particular outlet is presented by the interrogation means connected thereto and stored upon the related storage means to supplement the free-state signal already stored by the latter.

5. A switching network with control equipment, as claimed in claim 2 in which the equipment when employed for the release of a connection is operative to mark the particular outlet as a result of that outlet being encountered busy but not otherwise; the marking potential being connected upon activation of a predetermined relay means of a third category of said marking arrangements, the number of relay means in the second category being equal to the number of outlets in each set.

6. A switching network with control equipment, as claimed in claim 5 and in which said relay means of the third category is arranged to release after a period just sufficient to cover the release of the specified network connection whereupon a signal appropriate to the now prevailing free state of the particular outlet is presented by the interrogation means connected thereto and stored upon the related storage means to supplement the busy-state signal already stored by the latter.

7. A switching network with control equipment, as claimed in claim 4 in which each said interrogating means comprises a free-state detector and a busy-state detector and each said storage means comprises first and second toggles arranged to be set respectively under control of a signal from the related free-state or busy-state detector, and each said toggle when set applies a significant condition to an associated conductor of said outgoing signalling-path.

8. A switching network with control equipment, as claimed in claim 7 in which said equipment includes additional toggles for each stage of the switching network, and said additional toggles serve to monitor other functions appertaining to setting-up of the specified connection and to control the condition of other individually associated conductors of the outgoing signalling-path.

9. A switching network with control equipment, as claimed in claim 8 in which gating means in the control equipment is operative, when the first and second toggles concerned with the particular outlet have been set by the associated free-state and busy-state detectors respectively, to initiate a cycle for the prompt release of said equipment whereupon a calling condition is applied over a particular conductor of the outgoing signalling-path to signify to external equipment that a status message is available at the outgoing signalling-path.

10. A switching network with control equipment, as claimed in claim 9 in which said control equipment is otherwise responsive to test instruction messages such a message being operative upon the control equipment to limit its function to the interrogation of an appropriate set of network outlets and to the storage of the detected free or busy states of those outlets by said storage means for utilisation over said outgoing signalling-path.

11. A switching network with control equipment, as claimed in claim 8 in which said control equipment is so arranged that if during an attempt to set up a network-connection any condition of fault is encountered which interferes with establishment of that connection, a forced-release condition is developed by and for said equipment and a status message made available to the outgoing signalling-path includes conditions which are significant of said situation.

* * * * *